(12) United States Patent
Illion et al.

(10) Patent No.: US 9,262,620 B2
(45) Date of Patent: Feb. 16, 2016

(54) SECURE COMMUNICATIONS KIT AND CLIENT DEVICE FOR SECURELY COMMUNICATING USING THE SAME

(71) Applicants: Brian Eli Berl Illion, Toronto (CA); Leslie-Ann Dominy Kirijian, Toronto (CA)

(72) Inventors: Brian Eli Berl Illion, Toronto (CA); Leslie-Ann Dominy Kirijian, Toronto (CA)

( * ) Notice: Subject to any disclaimer, the term of this patent is extended or adjusted under 35 U.S.C. 154(b) by 107 days.

(21) Appl. No.: 13/798,915

(22) Filed: Mar. 13, 2013

(65) Prior Publication Data
US 2014/0281553 A1 Sep. 18, 2014

(51) Int. Cl.
| | |
|---|---|
| H04L 9/32 | (2006.01) |
| G06F 21/35 | (2013.01) |
| G06F 21/60 | (2013.01) |
| H04L 9/08 | (2006.01) |
| H04L 12/58 | (2006.01) |
| H04W 4/00 | (2009.01) |
| H04W 4/12 | (2009.01) |
| H04W 12/02 | (2009.01) |
| H04L 29/06 | (2006.01) |

(52) U.S. Cl.
CPC .............. *G06F 21/35* (2013.01); *G06F 21/606* (2013.01); *H04L 9/083* (2013.01); *H04L 9/0877* (2013.01); *H04L 51/00* (2013.01); *H04L 63/0272* (2013.01); *H04W 4/008* (2013.01); *H04W 4/12* (2013.01); *H04W 12/02* (2013.01); *G06F 2221/2107* (2013.01); *G06F 2221/2153* (2013.01); *H04L 63/0428* (2013.01); *H04L 63/065* (2013.01); *H04L 63/0853* (2013.01); *H04L 2209/805* (2013.01)

(58) Field of Classification Search
None
See application file for complete search history.

(56) References Cited

U.S. PATENT DOCUMENTS

| | | | | |
|---|---|---|---|---|
| 5,623,637 | A * | 4/1997 | Jones et al. | 711/164 |
| 6,980,651 | B2 | 12/2005 | Litwin, Jr. et al. | |
| 7,124,938 | B1 * | 10/2006 | Marsh | 235/382 |
| 7,225,334 | B2 | 5/2007 | Bianchi | |
| 2003/0204721 | A1 | 10/2003 | Barrus et al. | |
| 2004/0030898 | A1 * | 2/2004 | Tsuria et al. | 713/171 |
| 2009/0091427 | A1 * | 4/2009 | Shiotsu et al. | 340/10.1 |
| 2012/0265988 | A1 | 10/2012 | Ehrensvard | |

FOREIGN PATENT DOCUMENTS

| | | |
|---|---|---|
| FR | 2969877 | 6/2012 |
| WO | 00/57637 | 9/2000 |

* cited by examiner

*Primary Examiner* — Devin Almeida
(74) *Attorney, Agent, or Firm* — Bereskin & Parr LLP; Isis E. Caulder (57) ABSTRACT

A secure communication kit is disclosed. The secure communication kit may include a plurality of tangible security tokens; each security token storing one or more cryptographic keys and a group identifier. A first cryptographic key stored on each security token may correspond to one of the cryptographic key(s) stored on every of the other security tokens. The group identifier stored on each security token may correspond to each group identifier stored on every of the other security tokens. A client device for securely communicating using the secure communication kit is also disclosed.

8 Claims, 9 Drawing Sheets

SECURE COMMUNICATIONS KIT AND CLIENT DEVICE FOR SECURELY COMMUNICATING USING THE SAME

FIELD

The present disclosure relates to the field of secure electronic messaging.

INTRODUCTION

Over the past decade, electronic messaging has seen a surge in popularity. Today, electronic messaging is nearly ubiquitous. Many individuals send electronic messages, such as for example, emails, text messages (SMS), multimedia messages (MMS) and instant messages, at work and at home, many times every day. Electronic messages can be sent between electronic devices that are separated by great distances, even continents. In some cases, a message will pass through numerous intermediary devices (e.g. servers, gateways, switches and routers) as it travels from a sender's device to a recipient's device. Each intermediary device may present an added risk of interception and exposure of an electronic message to the chagrin of the sender and/or the recipient(s).

SUMMARY

In at least one embodiment, a secure communication kit is provided including a plurality of tangible security tokens. Each security token may store one or more cryptographic keys and a group identifier. A first cryptographic key stored on each security token may correspond to one of the cryptographic key(s) stored on every of the other security tokens in the kit. The group identifier stored on each security token may corresponds to each group identifier stored on every of the other security tokens of the kit.

In at least one embodiment, the first cryptographic key of each security token forms a symmetric key pair with one cryptographic key, of the one or more cryptographic keys, of every of the other security tokens in the kit.

In at least one embodiment, each security token stores the first cryptographic key and a second cryptographic key. The first cryptographic key of each security token may form an asymmetric key pair with the second cryptographic key of every of the other security tokens.

In at least one embodiment, for each security token, the first cryptographic key of that security token may not correspond to the second cryptographic key of that same security token.

In at least one embodiment, the secure communication kit also includes vending packaging enclosing the plurality of tangible security tokens.

In at least one embodiment, each of the plurality of tangible security tokens includes one or more of a scratch card, a smart card, a USB key, a barcode, a magnetic strip and an RFID tag.

In at least one embodiment, the group identifier of each of the plurality of security tokens is encrypted, and the group identifier of each of the plurality of security tokens is decryptable using a server decryption key.

In at least one embodiment, each of the plurality of security tokens has an appearance that corresponds to the appearance of each of the other security tokens in the plurality.

In at least one embodiment, a client device is provided for securely communicating using a secure communication kit. The client device may include at least one processor, and a memory. The memory may store computer executable instructions which when executed configure the at least one processor to, collectively, receive the one or more cryptographic keys and the group identifier of a first of a plurality of tangible security tokens, encrypt a first message using one of the received one or more cryptographic keys, send the encrypted first message and the group identifier to a server device, send a request for messages associated with the group identifier to the server device, in response to the request, receive a second message encrypted by one of the one or more cryptographic keys of a second of the plurality of tangible security tokens, and decrypt the encrypted second message using one of the received one or more cryptographic keys.

In at least one embodiment, receiving the one or more cryptographic keys may include receiving a first cryptographic key and a second cryptographic key, encrypting the first message comprises encrypting the first message using the first cryptographic key, and decrypting the encrypted second message comprises decrypting the encrypted second message using the second cryptographic key.

In at least one embodiment, the client device also includes a card reader, and the first security token includes a card. Also, receiving the one or more cryptographic keys and the group identifier may include the card reader reading the one or more cryptographic keys and the group identifier from the first security token.

In at least one embodiment, the client device also includes an RFID reader, and the first security token includes an RFID tag. Also, receiving the one or more cryptographic keys and the group identifier may include the RFID reader reading the one or more cryptographic keys and the group identifier from the first security token.

In at least one embodiment, the group identifier includes a server address. Sending the encrypted first message and the group identifier may include sending the encrypted first message and the group identifier to the server address. Sending the request for messages associated with the group identifier may include sending the request for messages to the server address.

In at least one embodiment, the server address is an SMS address.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Figure 1:
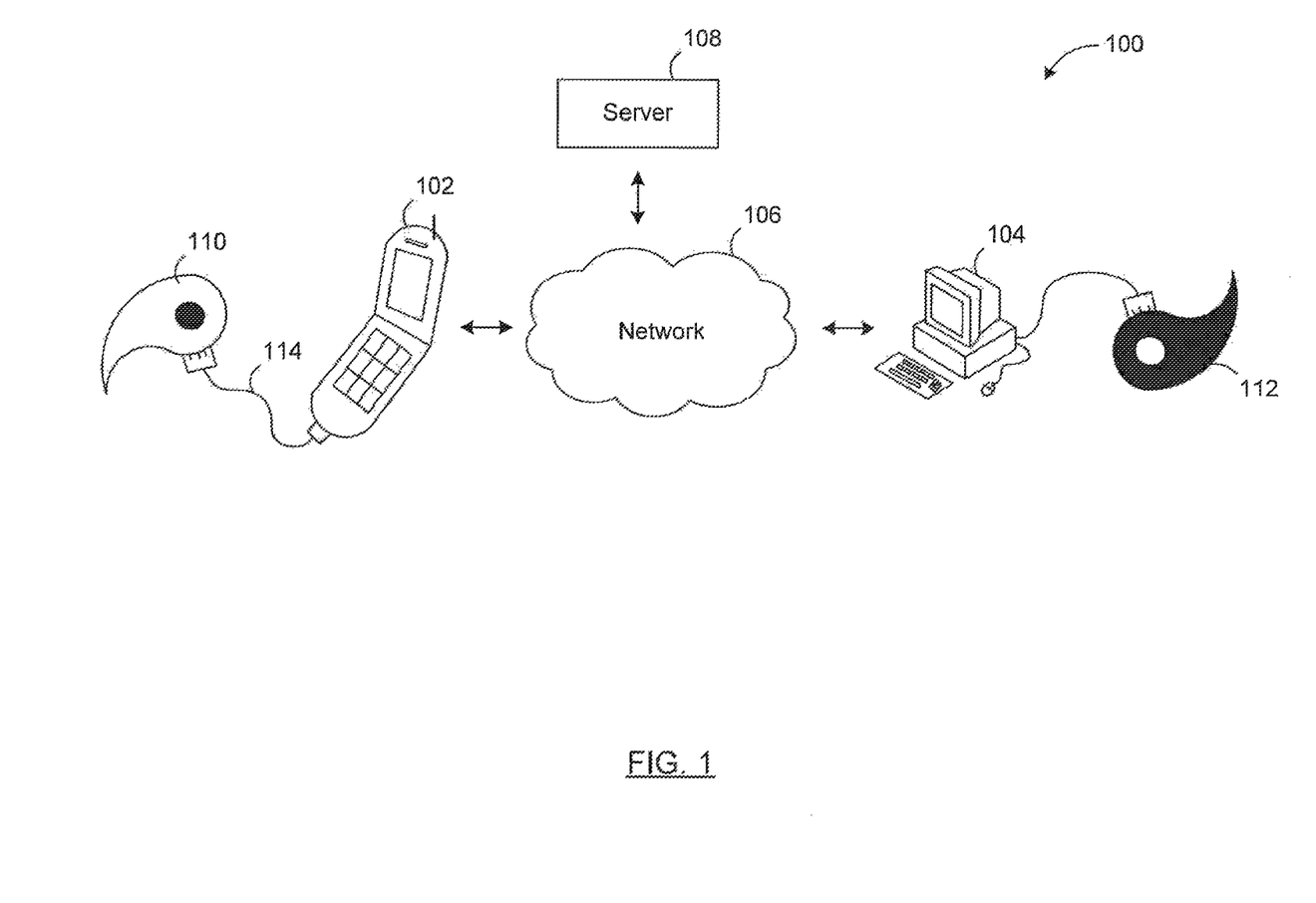
FIG. 1 is a schematic of a system for secure communication, in accordance with at least one embodiment.

Referring to FIG. 1, a schematic of a system 100 for secure communication is shown in accordance with at least one embodiment. In the example shown, system 100 includes a client device 102, a client device 104, a network 106 and a server device 108. As shown, client device 102 and client device 104 can send messages to the other across network 106 using server 108.

As used herein, and in the claims a "message" can include one or more of text, image(s), video(s), audio recording(s) or any other form of information that can be exchanged between electronic devices.

Figure 2:
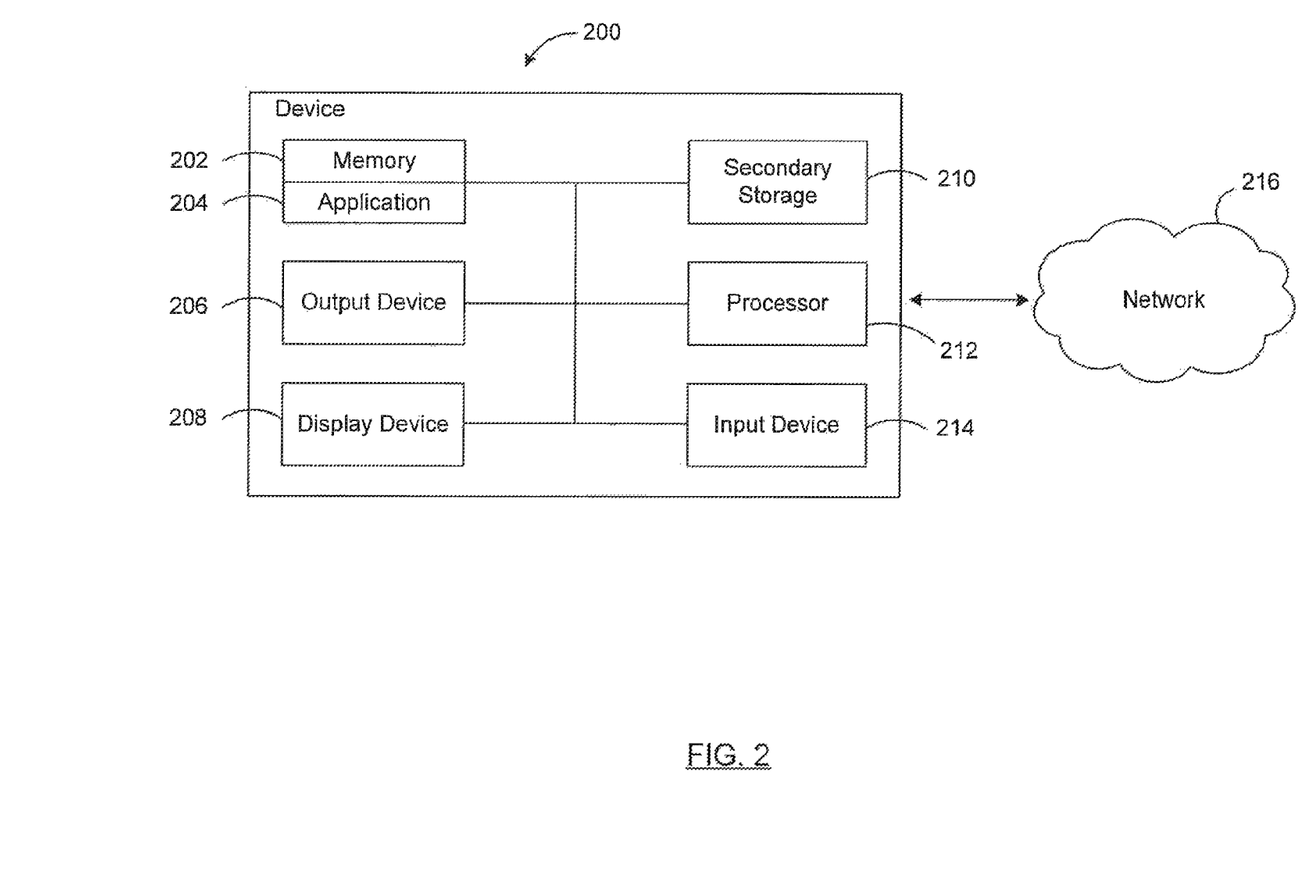
FIG. 2 is a schematic of a device, in accordance with at least one embodiment.

FIG. 2 shows an example schematic of a device 200. As shown, device 200 is generally illustrated as having hardware components, which can be used by one or more of the elements of system 100, such as client device 102, client device 104, and server device 108. Generally, a device 200 can be a server computer, desktop computer, notebook computer, tablet, PDA, smartphone, or another computing device. In the example of FIG. 1, client device 102 is illustrated as a smartphone, and client device 104 is illustrated as a desktop computer. The illustration of client devices 102 and 104 in FIG. 1 is not limiting.

In at least one embodiment, device 200 includes a connection with a network 216 such as a wired or wireless connection to the Internet, a private network or a cellular network, for example. In some cases, network 216 includes other types of computer or telecommunication networks. Network 216 may correspond with network 106 shown in FIG. 1.

In the example shown, device 200 includes a memory 202, an application 204, an output device 206, a display device 208, a secondary storage device 210, a processor 212, and an input device 214. In some embodiments, device 200 includes multiple of any one or more of memory 202, application 204, output device 206, display device 208, secondary storage device 210, processor 212, and input device 214. In some embodiments, device 200 does not include one or more of application 204, second storage device 210, input device 214, output device 206, and display device 208.

Memory 202 can include random access memory (RAM) or similar types of memory. Also, in some embodiments, memory 202 stores one or more applications 204 for execution by processor 212. Applications 204 correspond with software modules including computer executable instructions to perform processing for the functions and methods described below. Secondary storage device 210 can include a hard disk drive, floppy disk drive, CD drive, DVD drive, Blu-ray drive, solid state drive, flash memory or other types of non-volatile data storage.

In some embodiments, device 200 stores information in a remote storage device, such as cloud storage, accessible across a network, such as network 216 or another network. In some embodiments, device 200 stores information distributed across multiple storage devices, such as memory 202 and secondary storage device 210 (i.e. each of the multiple storage devices stores a portion of the information and collectively the multiple storage devices store all of the information). Accordingly, storing data on a storage device as used herein and in the claims, means storing that data in a local storage device, storing that data in a remote storage device, or storing that data distributed across multiple storage devices, each of which can be local or remote.

Generally, processor 212 can execute applications, computer readable instructions or programs. The applications, computer readable instructions or programs can be stored in memory 202 or in secondary storage 210, or can be received from remote storage accessible through network 216, for example. When executed, the applications, computer readable instructions or programs can configure the processor 212 (or multiple processors 212, collectively) to perform the acts described herein with reference to client device 102, client device 104 or server device 108, for example.

Input device 214 can include any device for entering information into device 200. For example, input device 214 can be a keyboard, key pad, cursor-control device, touch-screen, camera, or microphone. Input device 214 can also include input ports and wireless radios (e.g. Bluetooth®, or 802.11x) for making wired and wireless connections to external devices.

Display device 208 can include any type of device for presenting visual information. For example, display device 208 can be a computer monitor, a flat-screen display, a projector or a display panel.

Output device 206 can include any type of device for presenting a hard copy of information, such as a printer for example. Output device 206 can also include other types of output devices such as speakers, for example. In at least one embodiment, output device 206 includes one or more of output ports and wireless radios (e.g. Bluetooth®, or 802.11x) for making wired and wireless connections to external devices.

FIG. 2 illustrates one example hardware schematic of a device 200. In alternative embodiments, device 200 contains fewer, additional or different components. In addition, although aspects of an implementation of device 200 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM.

In the example shown, client device 102 is connected to a tangible security token 110, and client device 104 is connected to a tangible security token 112. Each of client devices 102 and 104 is able to use a respective one of security tokens 110 and 112 to encrypt outgoing messages and decrypt incoming messages.

Figure 3:
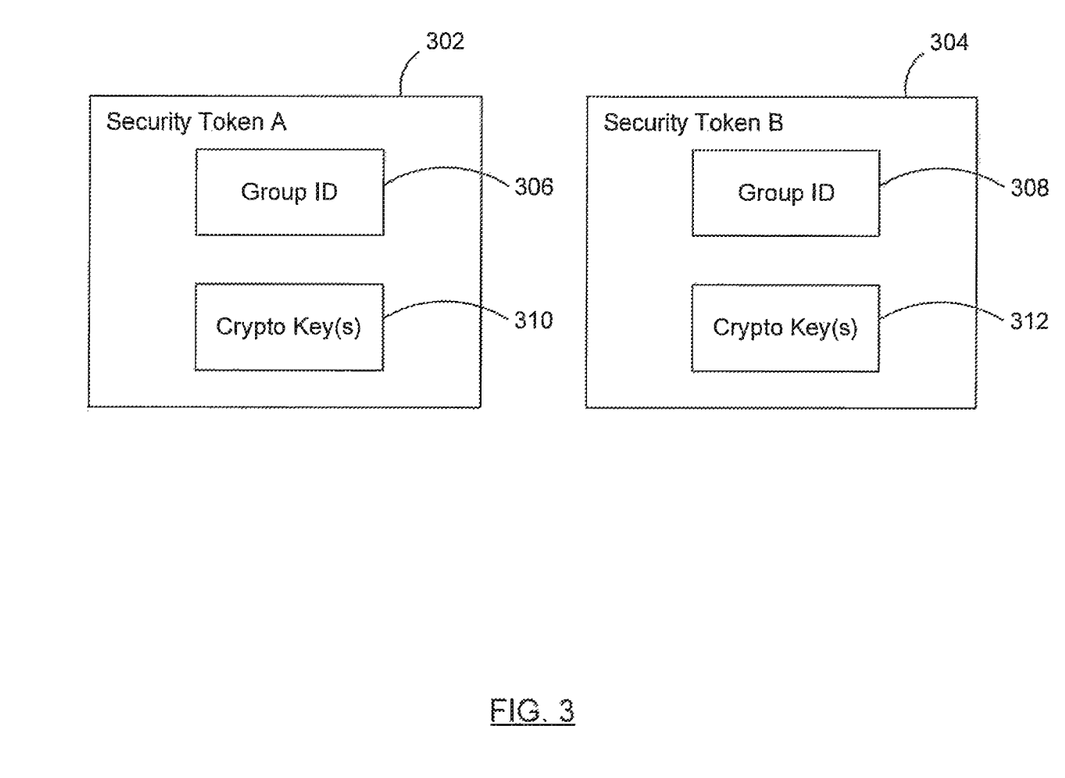
FIG. 3 is a schematic of two corresponding security tokens, in accordance with at least one embodiment.

FIG. 3 shows a schematic of two corresponding security tokens 302 and 304, in accordance with at least one embodiment. The features of security tokens 302 and 304 may be generally analogous to the features of security tokens 110 and 112, respectively, in FIG. 1. In the example shown, each security token includes a group identifier 306 or 308, and one or more cryptographic keys 310 or 312.

As used herein and in the claims, a first security token "corresponds" with a second security token if a message encrypted using information stored on the first security token can be decrypted using information stored on the second security token. In the example shown, security token 302 corresponds with security token 304.

As shown, security tokens 302 and 304 each store one or more cryptographic keys 310 or 312. As used herein, and in the claims, a cryptographic key may be a public or private key of an asymmetric key pair, or a symmetric key, for example.

As used herein and in the claims, a first cryptographic key "corresponds" to a second cryptographic key (and the second cryptographic key corresponds to the first cryptographic key) if information encrypted by the first cryptographic key can be decrypted by the second cryptographic key.

Two common forms of cryptography using cryptographic keys are symmetric cryptography and asymmetric cryptography. In symmetric cryptography, information encrypted using a cryptographic key can only be decrypted using the same cryptographic key. For example, a recipient of a message encrypted using a symmetric cryptographic key can only decrypt the message using the same symmetric cryptographic key. A symmetric cryptographic key stored on a first security token (e.g. security token 302) corresponds to the same (i.e. duplicate) symmetric cryptographic key stored on a second security token (e.g. security token 304).

In asymmetric cryptography, a public key of a public/private key pair corresponds to the private key of the same public/private key pair. Information encrypted using the public key can only be decrypted using the corresponding private key, and vice versa. For example, a recipient of a message encrypted using a public key of an asymmetric key pair, can only be decrypted using the private key of the same asymmetric key pair. A public key of a public/private key pair stored on a first security token (e.g. security token 302) corresponds to the private key of the same public/private key pair stored on a second security token (e.g. security token 304).

Figure 4:
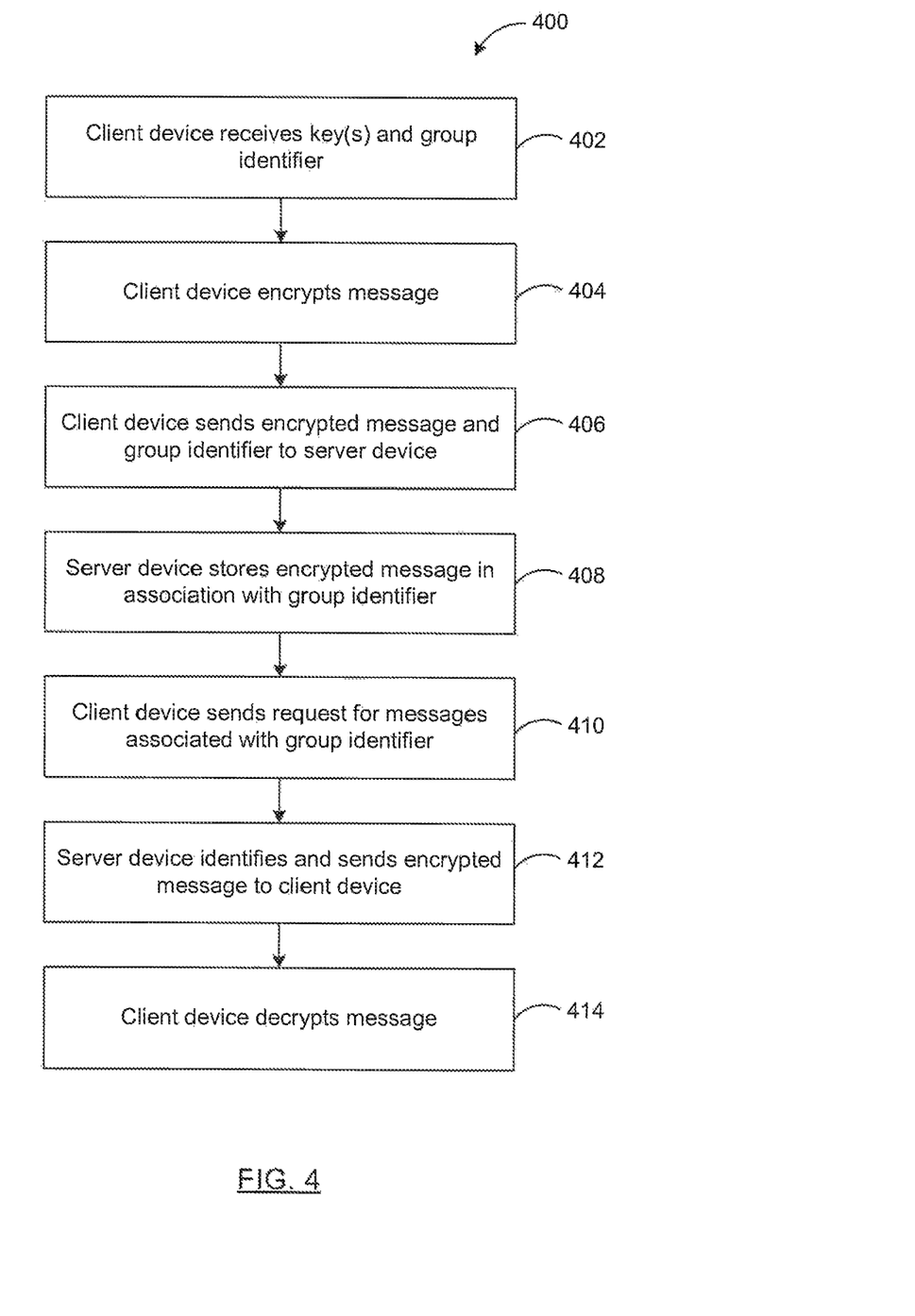
FIG. 4 is a flowchart illustrating a method for secure communication, in accordance with at least one embodiment.

Reference is now made to FIGS. 1 and 4. FIG. 4 shows a flowchart illustrating a method 400 for secure communication in accordance with at least one embodiment. For clarity of illustration, the method 400 is described with reference to system 100.

At 402, client device 102 receives one or more cryptographic keys and a group identifier that are stored on security token 110. In the example, shown, the cryptographic key(s) and the group identifier are transmitted to client device 102 from security token 110 across a wired connection 114 (e.g. a USB cable). In other embodiments, the cryptographic key(s) and the group identifier are received by client device 102 by a different method. A sampling of such methods is discussed later in this disclosure.

At 404, client device 102 encrypts a message (e.g. an email message composed at client device 102) using at least one of the cryptographic key(s) of security token 110 (received at 402). In at least one embodiment, at least one of the cryptographic keys of security token 110 is designated as an encryption key. In this case, client device 102 encrypts the message using the cryptographic key designated as an encryption key.

At 406, client device 102 sends the group identifier of security token 110, and the encrypted message, to server device 108. In at least one embodiment, client device 102 stores an address of server device 108, to which to send the encrypted message and the group identifier.

In at least one embodiment, client device 102 can derive the network address of server device 108 from information stored on security token 110. For example, security token 110 may store at least a partial address for server device 108. In one example, security token 110 stores a complete address for server device 108 (e.g. http://www.domain-name.com/messaging). In another example, security token 110 stores a partial address for server device 108 (e.g. a number N), and client device 102 stores a partial address for server device 108 (e.g. http://www.domain-name.com). In this example, client device 102 can receive the partial address stored on security token 110, and then derive a complete server address by combining the two partial addresses (e.g. http://www.domain-name.com/N).

At 408, server device 108 stores the encrypted message, received from client device 104 at 406, in association with the group identifier. In at least one embodiment, server device 108 operates as a "pull" server. That is, server device 108 may not deliver received encrypted messages until they are requested.

At 410, client device 104 sends a request for messages that are associated with a group identifier corresponding to the group identifier of security token 112. For example, client device 104 may send a request including the group identifier of security token 112. In the example shown, the group identifier of security token 112 corresponds with the group identifier of security token 110.

As used herein and in the claims, the group identifier of a first security token "corresponds" to the group identifier of a second security token if, for example, one or more of (i) the first security token corresponds to the second security token, (ii) at least a portion of the group identifiers are identical, (iii) server device 108 stores an indication that the group identifiers correspond (e.g. in a table), and (iv) the group identifiers are related by a predetermined mathematical relationship (e.g. whole number multiples). These are examples and this is not an exhaustive list.

At 412, server device 108 identifies and sends to client device 104 any encrypted messages that are stored in association with a group identifier corresponding to a group identifier identified in the request at 410 (e.g. included with the request at 410). In the example shown, server device 108 identifies and sends to client device 104 the encrypted message, stored at 406 in association with the group identifier of security token 110.

At 414, client device 104 decrypts the encrypted message received at 412 from server device 108. For example, client device 104 may decrypt the encrypted message using the cryptographic key of security token 112 that corresponds to the cryptographic key used by client device 102 at 404 to encrypt the message.

Generally, a security token may store information (e.g. cryptographic key(s), a group identifier and other optional information) in any one or more of a number of ways. For example, a security token may store such information as, one or more of, (i) data on a storage device (e.g. a USB key, CD, DVD, or Blu-Ray disc), (ii) printed plain text (e.g. on a paper card), and (iii) an encoding (e.g. a 1D or 2D barcode, a QR code, or a magnetic strip). These are examples and this is not an exhaustive list. In any case, as used herein and in the claims, a security token is a physical, tangible object in contrast with a mere parcel of electronic data.

Similarly, a client device can receive information stored on a security token in any one or more of a number of ways. For example, a client device can receive such information by, one or more of, (i) manual keypad entry (e.g. by a user transcribing information printed on a security token), (ii) image capture (e.g. by a camera or webcam capturing plain text or encodings printed on the security token), (iii) wired or direct reception (e.g. by physically connecting the security token to an input port of the client device), (iv) wireless remote reception (e.g. by Bluetooth, WiFi, or RFID transmission), and (v) a card reader (e.g. an SD card reader, a magnetic strip card reader, or a CHIP card reader, communicatively coupled to the client device). These are examples and this is not an exhaustive list.

Also, security tokens can be shaped and decorated to provide any suitable appearance. In at least one embodiment, corresponding security tokens have corresponding appearances. As used herein, and in the claims, a first security token has an appearance that "corresponds" to a second security token if the first and second security tokens can mate to form a coherent facade, and if the first and second security tokens when separated each include a portion of that coherent facade. In one example, two security tokens having corresponding appearances can mate to complete a shape such as a heart. In another example, two security tokens having corresponding appearances can mate to complete an image, such as a yin-yang symbol. In another example, six security tokens having corresponding appearances can mate to form a model of a person, each of the security tokens having a shape of one of a head, an arm, a leg or a torso.

FIGS. 5 to 8 illustrate a few example embodiments of security tokens which store information in a few different ways. A number of ways in which a client device can receive information stored on a security token is also described in reference to FIGS. 5 to 8.

Figure 5:
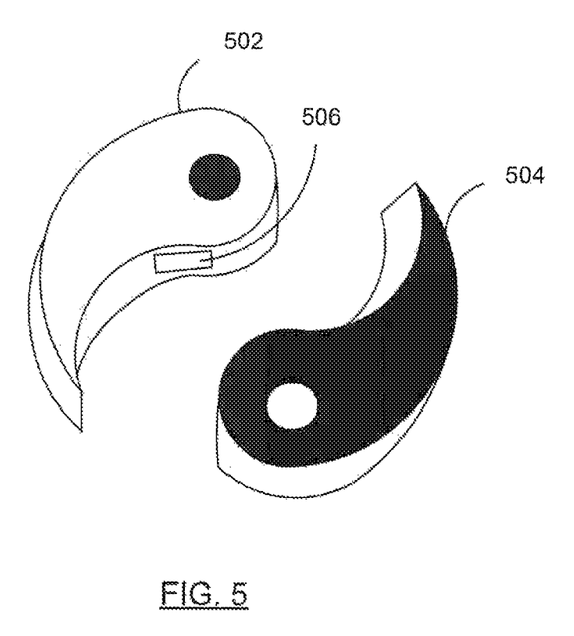
FIG. 5 is a perspective view of two corresponding security tokens configured as storage devices, in accordance with at least one embodiment.

FIG. 5 shows two corresponding security tokens 502, and 504 configured as storage devices, in accordance with at least one embodiment. Each of security tokens 502, and 504 includes a memory (not shown, e.g. flash memory) and a data access port 506 (e.g. a universal serial bus (USB) port) which can be used to make a wired connection to a client device. In this example, the memory of each security token 502 and 504 stores, at least, one or more cryptographic keys and a group identifier. A client device may receive the cryptographic keys and the group identifier from one of the security tokens 502 or 504, by downloading through a wired connection to the data access port 506 of that security token 502 or 504. As an example, FIG. 1 shows a wired connection between client device 102 and security token 110.

As shown, security tokens 502 and 504 have corresponding appearances. Each of security tokens 502 and 504 is a different half of a yin-yang symbol. Security tokens 502 and 504 are also sized and shaped to mate to form the complete yin-yang symbol. In at least one embodiment, security tokens 502 and 504 include retentive members (not shown) that can engage when security tokens 502 and 504 mate to retain security tokens 502 and 504 in a mated position.

Figure 6:
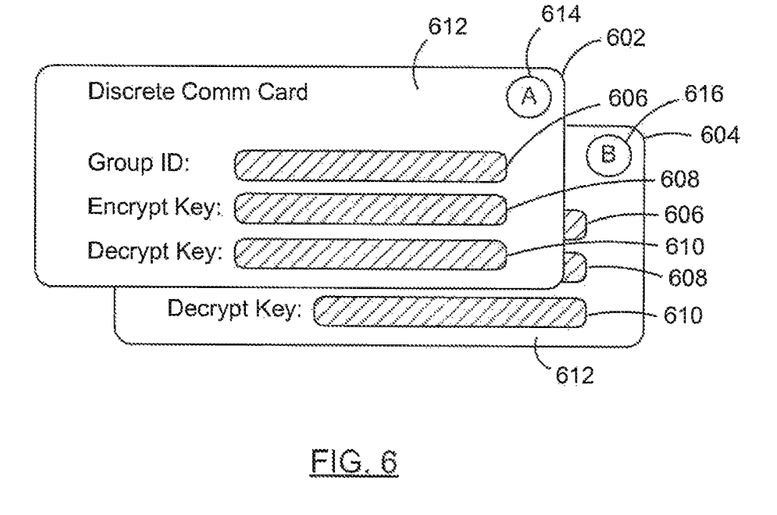
FIG. 6 is a front view of two corresponding security tokens configured as scratch cards, in accordance with at least one embodiment.

FIG. 6 shows two corresponding security tokens 602 and 604 configured as scratch cards, in accordance with at least one embodiment. In the example shown, each of security tokens 602 and 604 includes a substrate 612 having printed information hidden by three scratchable portions 606, 608 and 610. In at least one embodiment, the material of substrate 612 is paper or plastic based, and the scratchable portions 606, 608 and 610 include an opaque metallic latex.

As shown, scratchable portion 606 hides a printed group identifier, scratchable portion 608 hides a printed encryption key, and scratchable portion 610 hides a printed decryption key. In alternative embodiments, there may be a fewer or greater number of scratchable portions on each security token. For example, there may be an additional scratchable portion to cover a printed server address. In another example, each of the security tokens 602 and 604 include only one printed cryptographic key, hidden under a scratchable portion (e.g. in an embodiment using symmetric encryption). In at least one embodiment, a single scratchable portion covers two or more pieces of information (e.g. both the printed encryption key and the printed decryption key).

In the example shown, security tokens 602 and 604 store information (e.g. a group identifier, an encryption key and a decryption key) as printed matter. In at least some embodiments, the printed matter, beneath the scratchable portions 606, 608 and 610 takes the form of plain text or a barcode (e.g. 1D or 2D) for example.

In use, the scratchable portions 606, 608 and 610 can be removed (e.g. by scratching) to reveal the concealed information below. A client device can then receive the revealed information by any of a number of ways. For example, the information can be manually entered into a keypad of the client device, or the information can be captured by an image capture module (e.g. camera or webcam) of the client device.

In the example shown, the printed information is all provided on one side of substrate 612. In variant embodiments, some of the printed information is provided on one side of substrate 612, and some of the printed information is provided on another side of substrate 612. For example, an encryption key (e.g. beneath a scratchable portion) may be provided on a first side of substrate 612, while a decryption key (e.g. beneath a scratchable portion), may be provided on an opposite second side of substrate 612. This may help to prevent displaying all of the information of a security token 602 or 604 in the view of a single camera shot or frame (e.g. of a handheld camera or a security camera).

Figure 7:
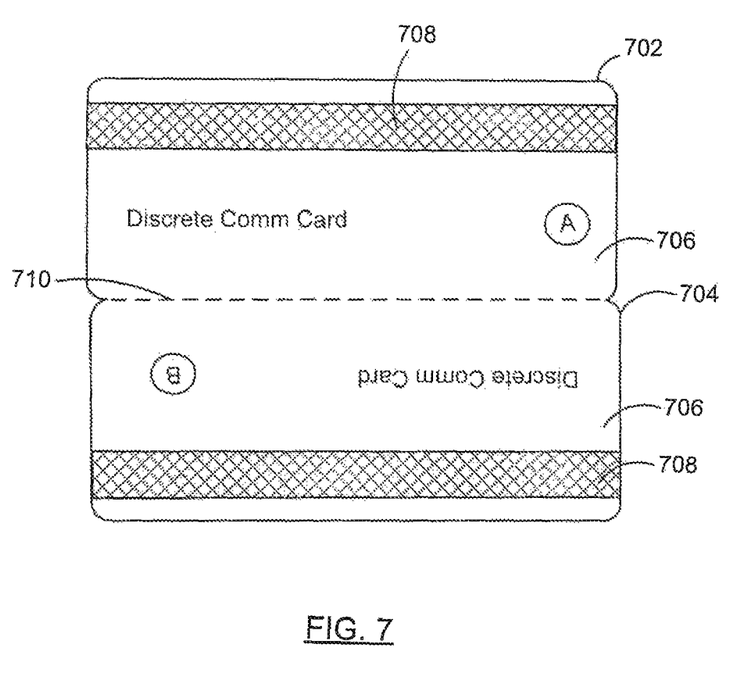
FIG. 7 is a front view of two corresponding security tokens configured as swipe cards, in accordance with at least one embodiment.

FIG. 7 shows two corresponding security tokens 702 and 704 configured as swipe cards, in accordance with at least one embodiment. In the example shown, each of swipe cards 702 and 704 includes a substrate 706 on which a magnetic strip 708 is provided. In at least one embodiment, the material of substrate 706 is paper or plastic based. As shown, each magnetic strip 708 stores one or more of: cryptographic key(s), a group identifier and a server address.

In one example, a client device is communicatively coupled to a magnetic card reader (not shown). The card reader can read the information stored on one of security tokens 702 and 704, and send that information to the client device. In this example, a user can swipe security token 702 or 704 through the card reader, which will transfer the information stored on that security token 702 or 704 to the client device. In some embodiments, the card reader is directly connected or integrated with the client device. In one embodiment, the card reader is located remotely from the client device and communicates with the client device by wire or wirelessly (e.g. by Bluetooth or Infrared transmissions).

Figure 8:
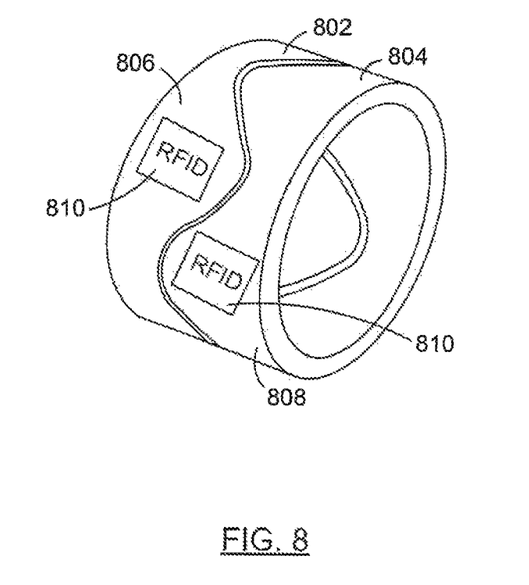
FIG. 8 is a front view of two corresponding security tokens configured as jewelry, in accordance with at least one embodiment.

FIG. 8 shows two corresponding security tokens 802 and 804 configured as jewelry, in accordance with at least one embodiment. In the example shown, security token 802 includes an annular base 806 and security token 804 includes an annular base 808. As shown, each of security tokens 802 and 804 also includes an RFID tag 810. RFID tags 810 store the information of the respective security token (e.g. cryptographic key(s), a group identifier and a server address). In use, a client device can receive the information stored on a security token 802 or 804, by using an RFID reader to read the information stored on the security token's RFID tag 810.

As shown, security tokens 802 and 804 each have corresponding appearances. Each security token 802 and 804 is sized and shaped to mate with the other and they form a uniform annular ring (e.g. for wearing about a finger) when so mated.

The sets of corresponding security tokens, shown by way of example, in FIGS. 5 to 8, each include two security tokens. However, in variant embodiments, a set of corresponding security tokens can include any number of security tokens greater than two. For example, a set of corresponding security tokens may include ten security tokens.

In some embodiments, security tokens are sold in sets of two or more corresponding security tokens, optionally packaged in vendible packaging (e.g. shrink wrap or a ribbon). For example, a convenience store may sell packs of two scratch card type or two swipe card type security tokens (see FIGS. 6 and 7, for example). In another example, an electronics store may sell packs of two or more storage device type security tokens (see FIG. 5, for example). In a further example, a jewelry store may sell jewelry that is separable into two or more security tokens (see FIG. 8, for example). As illustrated in FIG. 7, a set of corresponding security tokens may be frangibly joined (e.g. along a perforated or scored line 710). In this case, the set of corresponding security tokens may be separated by breaking the frangible connection.

In the examples shown in FIGS. 5 to 8, within a set of corresponding security tokens, the security tokens are of the same type (e.g. both scratch cards, both swipe cards, both storage devices). In variant embodiments, a set of corresponding security tokens can include different types of security tokens. Accordingly, within a set of corresponding security tokens, different security tokens may store information differently (e.g. in memory, as printed plain text, and in an encoding), and client devices may receive information from different of those security tokens differently (e.g. wireless, by wire, and by manual input). In one embodiment, a set of corresponding security tokens includes a scratch card type security token, and a storage device type security token.

In at least one embodiment, a purchaser or acquirer of a set of corresponding security tokens can keep at least one security token and distribute the others to whomever they wish to securely communicate. For example, each member of a board of directors may possess a corresponding security token for communication with the other board members. In another example, each of a pair of forbidden lovers possesses a corresponding security token for secure communication with the other.

Figure 9:
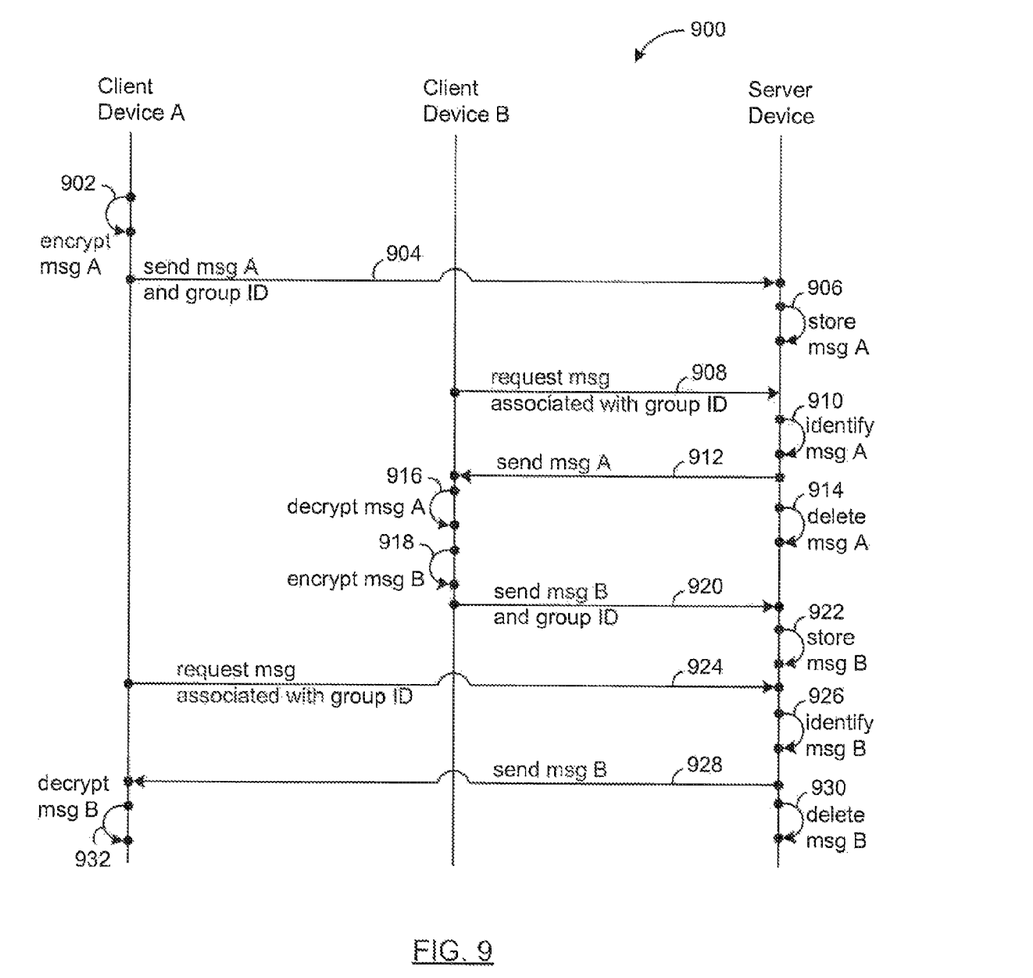
FIG. 9 is a process flow diagram illustrating a secure communication scenario between two client devices.

Reference is now made to FIG. 9, which shows a process flow diagram 900 illustrating a secure communication scenario between two client devices, A and B. In this example, client device A has received an encryption key, a decryption key, a group identifier and a server address of a first security token. Similarly, client device B has received an encryption key, a decryption key, a group identifier and a server address of a second security token. The first security token corresponds to the second security token.

At 902, client device A encrypts a message A using the encryption key of the first security token. The encryption key may be an asymmetric key that corresponds to the decryption key of the second security token.

At 904, client device A sends to the server device, the encrypted message A, and the group identifier of the first security token. Client device A may derive the address of the server device from information on the first security token, as described above. In at least one embodiment, the server address is one of a web address (e.g. an Internet protocol address), a radio frequency, a telephone number, and an SMS number. In the case of a radio frequency, the client device A may transmit encrypted message A at the radio frequency. In the case of a telephone number, the client device A may dial the telephone number and transmit encrypted message A when the cell is answered and a connection is established. In the case of an SMS number, the client device A may transmit encrypted message A as an SMS message to the SMS number.

In at least one embodiment, client device A also sends a security token identifier to the server device at 904. The security token identifier may be, for example, an alphanumeric code that is at least unique among corresponding security tokens. In one example, the security token identifiers of a set of corresponding security tokens are sequential numbers or letters (e.g. 1, 2, 3, and 4; or A, B, C, and ED) which can be used to distinguish one security token from another security token, within a set of corresponding security tokens. For example, in FIG. 6, security token 602 has a security token identifier 614 ("A"), and security token 604 has a security token identifier 616 ("B").

In at least one embodiment, the corresponding group identifiers stored on a set of corresponding security tokens are all different. For example, the group identifiers may be whole number multiples of one of the group identifiers of the set of corresponding security tokens. In a simple example, the corresponding group identifiers of a set of corresponding security tokens may be "21", "42" and "63". Group identifiers "42" and "63" are mathematically double and triple the group identifier "21", respectively. In this case, the security tokens of the set may be distinguishable by group identifier.

In at least one embodiment, the group identifier of the first security token is encrypted. For example, the encrypted group identifier of the first security token may only be decrypted using a server cryptographic key. In some embodiments, a single field of data (whether printed, or digitally stored) on a security token includes a group identifier and a security token identifier encrypted together as one parcel of data. For example, the decrypted parcel of data may include the security token identifier concatenated with the group identifier. As used herein and in the claims, a group identifier is "stored" when the group identifier is stored unencrypted, encrypted or encrypted together with other information. Similarly, as used herein and in the claims, a group identifier is "sent" when the group identifier is sent unencrypted, encrypted, or encrypted together with other information.

In at least one embodiment, client device A sends to the server device, a credential (e.g. a PIN, password, fingerprint image, voiceprint or other biometric reading) at 904. In one example, when the server device receives a first ever communication (e.g. a message or request for messages) associated with a particular security token (e.g. from a client device) including a credential, the server device stores the credential in association with that security token (e.g. distinguished by the received group identifier and/or security token identifier). In this example, the server device will thereafter disregard (or otherwise reject) any communication associated with that security token unless the communication includes the same credential. This may help to prevent the interception of encrypted messages caused by the loss, theft or copying of a security token. In at least one embodiment, if the server device receives a predetermined number of communications, associated with a security token, including incorrect credentials, the server device will thereafter disregard (or otherwise reject) all communications associated with that security token.

At 906, the server device stores encrypted message A in association with the group identifier of the first security token. If the group identifier, received at 906, is encrypted, then the server device decrypts the group identifier, using a server cryptographic key, for example.

In at least one embodiment, the server device does not have access to a cryptographic key that can be used to decrypt stored encrypted messages. This may help to prevent the encrypted messages from being decrypted if the server device is compromised (e.g. by hacking).

In at least one embodiment, at 906, the server device stores the encrypted message A in association with the group identifier and a security token identifier of the first security token. This may permit the server device to distinguish which, of the set of first and second corresponding security tokens, sent encrypted message A. For example, in response to a subsequent request for messages from client device A, the server device can avoid sending client device A messages associated with the first security token (such as encrypted message A). In variant embodiments, each of the corresponding first and second security tokens has a different group identifier. In this case, the server device may distinguish messages associated with the first security token, from messages associated with the second security token using the group identifiers alone.

In at least one embodiment, a set of corresponding security tokens have limited usage. For example, a set of corresponding security tokens can be time limited, limited by number of messages sent and/or received, and/or limited by size (e.g. in bytes).

In the case of a time limitation, the server device may, for example, record an expiration date/time that is a predetermined time period after the date/time when a first message is received in association with one of the group identifiers of a set of corresponding security tokens. After the expiration date/time, the server device may disregard (or otherwise reject) communications, from client devices, including any group identifier of that set of corresponding security tokens.

In the case of a limitation by number of messages, the server device may store a tally of messages received or sent in association with any of the group identifiers of a set of corresponding security tokens. When the tally exceeds a predetermined number, the server device may disregard (or otherwise reject) communications, from client devices, including any group identifier of that set of corresponding security tokens.

In the case of a limitation by size, the server device may store a total size of data (e.g. in bytes) of messages sent, received or both, in association with any of the group identifiers of a set of corresponding security tokens. When the total size exceeds a predetermined amount, the server device may disregard (or otherwise reject) communications from client devices including any group identifier of that set of corresponding tokens.

At 908, client device B sends a request for messages that are associated with group identifiers corresponding to the group identifier of the second security token. The request may include the group identifier of the second security token. The request optionally includes credentials, as discussed above.

At 910, the server device identifies stored messages associated with any group identifiers corresponding to the group identifier of the second security token. As discussed above, in at least one embodiment, group identifiers may correspond to each other if they are equal. In this case, the server device may identify messages that are stored in association with a group identifier equal to the group identifier of the second security token. In at least one embodiment, the server stores indication(s) of the correspondence between group identifiers (e.g. in a table). In this case, the server device may use the stored indication(s) to identify those group identifiers that correspond to the group identifier of the second security token, and then identify any messages stored in association with those group identifiers.

In at least one embodiment, at 910, the server device identifies stored messages excluding messages associated with the second security token. As discussed above, the server device may distinguish the security token associated with a stored encrypted message using the group identifier (if corresponding group identifiers are different), and/or the secure token identifier received with the encrypted message.

At 912, the security device sends encrypted message A to client device B. For example, the security device may send encrypted message A to the SMS address, telephone address, web address, email address or across the frequency from which the request from client device B at 908 originated. In alternative embodiments, the request at 908 from client device B may include a reply address. In this case, at 912, the server device may send encrypted message A to the reply address specified in the request.

At 914, the server device deletes encrypted message A. This may help to prevent encrypted message A from being subsequently compromised (e.g. stolen or lost). In at least one embodiment where the set of corresponding security tokens includes three or more corresponding security tokens, the server device deletes encrypted message A only after encrypted message A has been sent in reply to requests associated with each other corresponding security token in the set (i.e. each security token of the set except the security token associated with message). This may ensure that an encrypted message is not deleted before all of the recipients (e.g. the possessors of the other security tokens) have received the encrypted message. In at least one embodiment, the sewer device deletes encrypted message A upon the expiry of a predetermined time period from the receipt of the message, regardless of whether all recipients have been sent the message.

At 916, client device B decrypts encrypted message A using the decryption key of the second security token. In at least one embodiment, message A (whether it includes audio, video, image-data or text-data) is presented at client device B (e.g. displayed on a display device, and/or audibly emitted through speakers).

At 918, client device B encrypts a message B using an encryption key of the second security token. In this example, the encryption key corresponds with the decryption key of the first security device.

At 920, 922, 924, 926, 928 and 930, client device B sends the encrypted message B to the server device, the server device stores the encrypted message B, client device A sends a requests for messages, the server device identifies encrypted message B, the server device sends encrypted message B to client device A and the server device deletes encrypted message B analogously to how similar steps 904, 906, 908, 910, 912, and 914 are described above.

At 932, client device A decrypts encrypted message B using the decryption key of the first security token. In at least one embodiment, the decrypted message B (e.g. including one or more of audio, video, image-data or text-data) is presented at client device A (e.g. displayed on a display device, and/or audibly emitted through speakers).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A secure communication kit comprising:
   a plurality of tangible security tokens;
   each security token storing at least a first cryptographic key, one or more second cryptographic keys, and a group identifier,
   the first cryptographic key of each security token forming an asymmetric key pair with one of the second cryptographic keys of every of the other security tokens,
   the first cryptographic key of each security token not corresponding to any other cryptographic key stored on that security token; and
   the group identifier stored on each security token corresponding to each group identifier stored on every of the other security tokens
   wherein
   each of the plurality of tangible security tokens includes one or more of a scratch card, a smart card, a USB key, a barcode, a magnetic strip and an RFID tag,
   the group identifier of each of the plurality of security tokens is encrypted; and
   the group identifier of each of the plurality of security tokens is decryptable using a server decryption key.

2. The secure communication kit of claim 1, further comprising:
   vending packaging enclosing the plurality of tangible security tokens.

3. The secure communication kit of claim 1, wherein each of the plurality of security tokens has an appearance that corresponds to the appearance of each of the other security tokens in the plurality.

4. A client device for securely communicating using a secure communication kit, the client device comprising:
   at least one processor; and
   a memory, the memory storing computer executable instructions which when executed configure the at least one processor to collectively:
   receive at least a first cryptographic key, one or more second cryptographic keys, and a group identifier of a first of a plurality of tangible security tokens, wherein each of the plurality of tangible security tokens includes one or more of a scratch card, a smart card, a USB key, a barcode, a magnetic strip and an RFID tag, and wherein the group identifier is encrypted and the group identifier is decryptable using a server decryption key;
   encrypt a first message using the first cryptographic key of the first tangible security token;
   send the encrypted first message and the group identifier to a server device;
   send a request for messages associated with the group identifier to the server device;
   in response to the request, receive a second message encrypted by a first cryptographic key of a second of the plurality of tangible security tokens; and
   decrypt the encrypted second message using one of the second cryptographic keys of the first tangible security token;
   wherein the first cryptographic key used to encrypt the first message does not correspond to any of the second cryptographic keys of the first security token.

5. The client device of claim 4, further comprising:
   a card reader;
   wherein:
   the first security token includes a card; and
   receiving the first cryptographic key, the one or more second cryptographic keys, and the group identifier of the first security token comprises the card reader reading the first cryptographic key, the one or more second cryptographic keys, and the group identifier from the first security token.

6. The client device of claim 4, further comprising:
   an RFID reader;
   wherein:
   the first security token includes an RFID tag; and
   receiving the first cryptographic key, the one or more second cryptographic keys, and the group identifier of the first security token comprises the RFID reader reading the first cryptographic key, the one or more second cryptographic keys, and the group identifier from the first security token.

7. The client device of claim 4, wherein:
   the group identifier includes a server address;
   sending the encrypted first message and the group identifier includes sending the encrypted first message and the group identifier to the server address; and
   sending the request for messages associated with the group identifier comprises sending the request for messages to the server address.

8. The client device of claim 7, wherein:
   the server address is an SMS address.

* * * * *